Feb. 15, 1966     W. B. HANSEL     3,235,341
DISC CONSTRUCTION FOR REACTORS
Filed Dec. 11, 1963     2 Sheets-Sheet 1

INVENTOR.
William B. Hansel
BY George L. Church
ATTORNEY

Feb. 15, 1966   W. B. HANSEL   3,235,341
DISC CONSTRUCTION FOR REACTORS
Filed Dec. 11, 1963   2 Sheets-Sheet 2
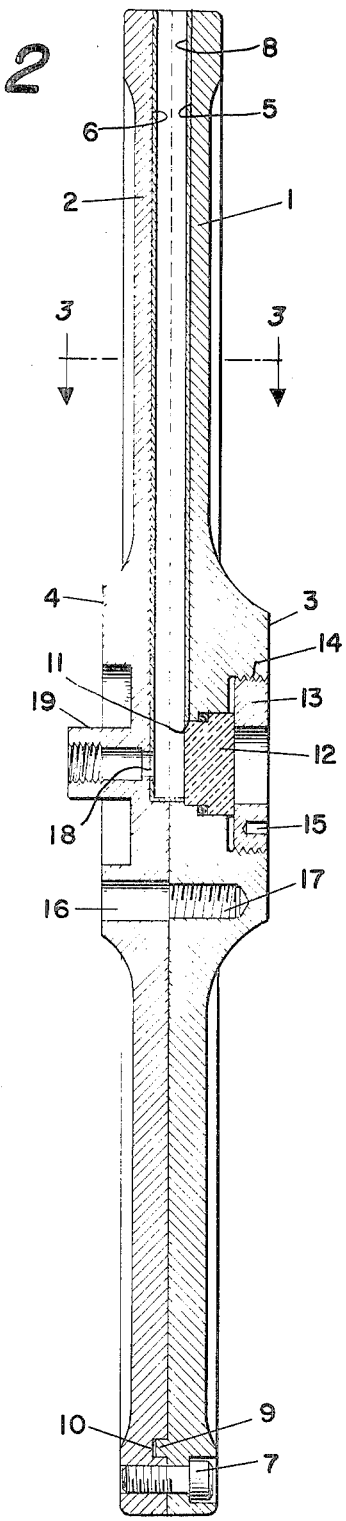
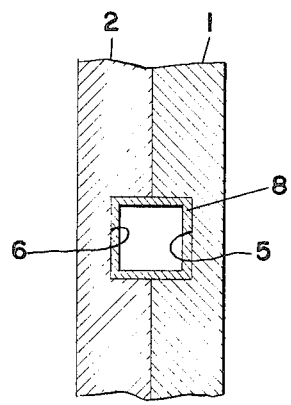
INVENTOR.
William B. Hansel.
BY George L. Church
ATTORNEY United States Patent Office 3,235,341
Patented Feb. 15, 1966

3,235,341
DISC CONSTRUCTION FOR REACTORS
William B. Hansel, Media, Pa., assignor to Sun Oil Company, Philadelphia, Pa., a corporation of New Jersey
Filed Dec. 11, 1963, Ser. No. 329,729
10 Claims. (Cl. 23—284)

This invention relates to a disc construction or disc assembly useful in reactors of the so-called wave engine type.

Recently, there has been developed a device, termed a wave engine, for carrying out chemical reactions of the endothermic type. In this device, chemical reactions are carried out by subjecting the reactants to one or more mechanical shock waves, thereby to produce a high temperature in such reactants for a very short period of time. A wave engine which utilizes shock waves is disclosed in my copending application, Serial No. 326,009, filed Nov. 26, 1963.

In the wave engine described in said copending application, a straight elongated shock tube (in which the aforesaid shock waves are developed) rotates in a vertical plane within a stationary port ring, which latter has ports for delivering gases to, and abstracting gases from, the tube. To provide appropriate sealing within the port ring, thereby to enable the operation of the engine to follow a desired sequence, the shock tube (which has rather small transverse dimensions) is made to form part of an otherwise imperforate disc whose outer diameter matches closely the inner diameter of the port ring; the shock tube extends diametrically of this disc. For proper establishment of the shock waves in this rotating-shock-tube type of wave engine, it is necessary that the shock tube have a cross-section with sharp corners (specifically, square corners). The fabrication of a disc of appreciable size (say twelve inches in diameter, for example) with a non-circular internal hole extending diametrically thereof, presents quite a problem. In fact, it would be impossible to fabricate such a device by any ordinary techniques.

An object of this invention is to provide a novel disc construction for wave engines.

Another object is to provide a disc construction for wave engines which solves the fabrication problems arising as a result of the configuration of the completed disc.

A further object is to provide a convenient and relatively inexpensive disc construction for wave engines of the rotating-shock-tube type.

The objects of this invention are accomplished, briefly, in the following manner: The disc assembly utilizes a pair of mating disc sections (elements) secured together in face-to-face relationship. Each of these two sections has therein a U-shaped but square-cornered groove which extends diametrically of the respective section, the two grooves mating to form a composite channel of square cross-section when the disc sections are secured together. A tube of square cross-section is positioned in this composite channel, and is fixedly secured therein. This latter tube comprises the shock tube for the wave engine.

A detailed description of the invention follows, taken in conjunction with the accompanying drawings, wherein:

FIG. 2 is a vertical section through the disc assembly, taken on line 2—2 of FIG. 1;

FIG. 3 is a partial section, taken on line 3—3 of FIG. 2; and

Figure 1:
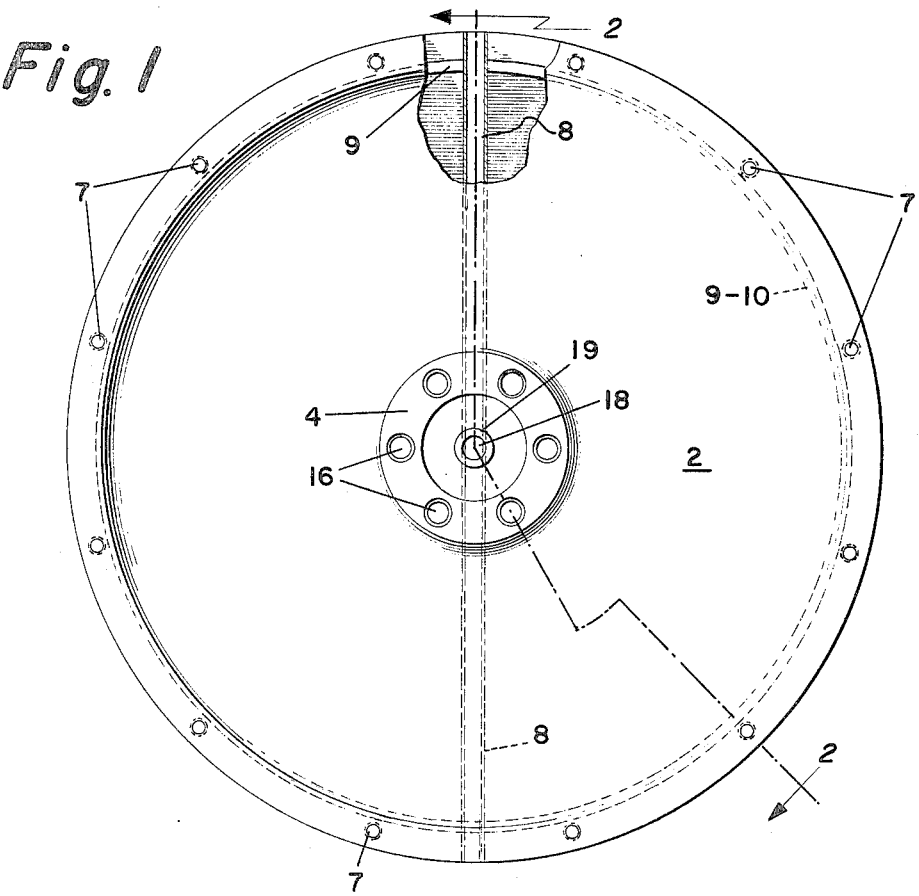
FIG. 1 is a front elevation or face view of a disc assembly according to this invention.
Figure 4:
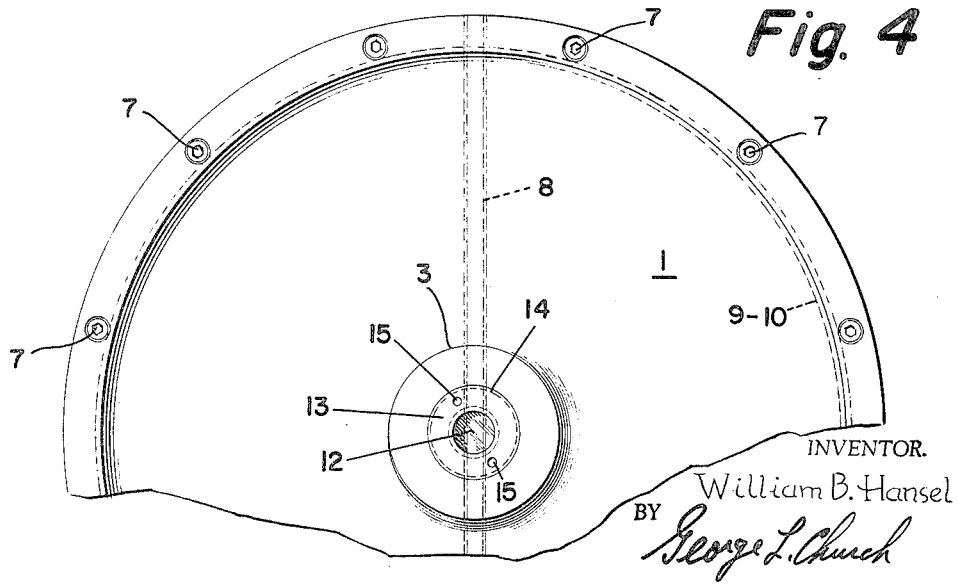
FIG. 4 is a partial view similar to FIG. 1, but looking at the opposite side of the assembly.

Referring now to the drawings, the disc assembly of this invention comprises two mating disc elements 1 and 2, each of circular outer configuration, say about twelve inches in diameter. Disc element 1 is made thicker in its central region to provide a hub 3, while disc element 2 is made thicker in its central region to provide a hub 4. Cut into that face of disc element 1 which is opposite to hub 3 is a U-shaped but square-cornered groove (i.e., a squared groove) 5 which extends diametrically of disc element 1. Cut into that face of disc element 2 which is opposite to hub 4 is a similar U-shaped but square-cornered groove (i.e., a squared groove) 6 which extends diametrically of disc element 2. The dimensions of the two grooves 5 and 6 are such that when the two elements 1 and 2 are assembled in face-to-face relationship with the hubs 3 and 4 toward the outside, a channel of square cross-section is formed conjointly by the two grooves (see FIG. 3). This channel, of course, extends diametrically of the disc assembly. The inner faces of the disc elements 1 and 2 are planar, except for the respective grooves 5 and 6.

The disc elements 1 and 2 are sandwiched together and held in assembled relation (in face-to-face relation) by means of a plurality (twelve in number, for example, see FIG. 1) of bolts 7 distributed on a base circle of say 11½ inches diameter. Bolts 7 pass through disc element 1 (into which element their heads are countersunk, as shown in FIG. 2) and thread into tapped holes in disc element 2.

Prior to assembly of the two disc elements 1 and 2, a tube 8 of square cross-section (¼ inch by ¼ inch, for example) is fitted closely into the channel formed by grooves 5 and 6, to provide a straight elongated shock tube (approximately twelve inches in length) which extends diametrically of the disc assembly. Tube 8 is open at both ends, and the ends of this tube of square cross-section are machined to have the same diameter as the disc elements 1 and 2.

To assure proper registry of elements 1 and 2 when the disc is being assembled, a tongue-and-groove construction is utilized, comprising a circular squared tongue 9 on element 1 which mates with a circular squared groove 10 in element 2. The center lines of tongue 9 and groove 10 define a circle of eleven inches diameter, for example and items 9 and 10 are substantially complete circles, being interrupted only at the ends of grooves 5 and 6, respectively.

For certain purposes, visual inspection of the interior of tube 8 may be desired. To provide for this, an opening 11 is cut through the front wall of tube 8, centrally of the length thereof and centrally of hub 3. In aperture 11, there is positioned a stepped quartz window 12 which is held in position by a threaded bushing 13, this bushing being threaded at 14 into a tapped hole provided in disc element 1. Holes 15 for the accommodation of a spanner-type wrench are provided in the outer face of bushing 13. The window 12 fits in a suitable hole provided in disc element 1, this hole being of course concentric with opening 11. The inner step of the window 12 in effect fills in the aperture 11, and forms a continuation of the wall of tube 8, for gas flow in such tube. To effect such a continuation of the tube wall, the inner face of window 12 must be flush with the inner wall of tube 8.

When the disc assembly of this invention is being used in a wave engine, the disc assembly is rotated at a high rate of speed by means of a shaft (not shown) which is coupled to the rear side of the assembly. More specifically, an integral collar, on one end of a rotatable shaft, can be bolted to the disc assembly by means of a plurality (six in number, for example) of bolts which coact with an equal number of bolt holes 16 distributed on a base circle of say 2⅛ inches diameter. Holes 16 pass through disc element 2, and these holes are aligned with respective tapped holes 17 extending into disc element 1. Thus, the heads of the six bolts (not shown) can engage the aforementioned integral collar (not shown), and the shanks of these bolts pass through respective holes 16 and thread into respective holes 17. These bolts, in addition to coupling the disc assembly to a rotatable shaft, serve to help secure the disc elements 1 and 2 together. For additional details relative to the construction at the rear side of the assembly, reference may be had to my aforementioned copending application.

The disc assembly is provided with an arrangement whereby a pressure measurement device (transducer) may be coupled to tube 8. An aperture 18 is provided in the rear wall of tube 8, centrally of the length thereof and centrally of hub 4. In this aperture a pressure transducer (not shown) may be inserted, to measure the pressure at the center of tube 8 during use of the disc assembly. The transducer is so constructed that it in effect fills in the aperture 18, and forms a continuation of the wall of tube 8, for gas flow in such tube. To form such a continuation of the tube wall, the inner end of the pressure transducer must be flush with the inner wall of tube 8. The pressure transducer leads (not shown) may be taken off through a conduit (not shown) which threads into a threaded fitting 19 provided at the center of the rear face of the disc assembly, and aligned with aperture 18.

The square tube 8 provides a hole which extends diametrically of the disc assembly. For proper shock tube action, it is important to have optimum surface finish in such a hole. It has been found that commercially-drawn tubing (used for tube 8) affords the required surface finish.

The invention claimed is:

1. For a wave engine, a rotatable disc assembly comprising a pair of mating disc sections, means securing said disc sections together in face-to-face relationship, the inner face of each of said disc sections having therein an elongated non-circular groove, said grooves mating to form a composite channel of non-circular cross-section when the disc sections are secured together; and a tube of non-circular cross-section matching the cross-section of said channel and positioned therein.

2. A disc assembly as defined in claim 1, wherein said tube is fixedly secured in said channel, and wherein the ends of said tube are aligned with the outer periphery of said disc assembly.

3. A disc assembly as defined in claim 1, wherein each of said grooves is sharp-cornered, and wherein said composite channel and said tube are both of quadrilateral cross-section.

4. A disc assembly as defined in claim 1, wherein each of said grooves is substantially U-shaped but square-cornered, and wherein said composite channel and said tube are both of square cross-section.

5. A disc assembly according to claim 1, wherein each of said disc sections has a circular inner face, and wherein each of said grooves extends along a diameter of its respective inner face.

6. A disc assembly as set forth in claim 5, wherein said tube is fixedly secured in said channel, and wherein the ends of said tube are aligned with the circular outer periphery of said disc assembly.

7. A disc assembly according to claim 1, wherein each of said disc sections has a circular inner face, wherein each of said grooves extends along a diameter of its respective inner face, wherein each of said grooves is sharp-cornered, and wherein said composite channel and said tube are both of quadrilateral cross-section.

8. A disc assembly as set forth in claim 7, wherein each of said grooves is substantially U-shaped but square-cornered, and wherein said composite channel and said tube are both of square cross-section.

9. A disc assembly in accordance with claim 1, wherein one of said disc sections has therein a central aperture, and wherein one wall of said tube has therein an aperture aligned with said first-mentioned aperture, thereby to provide an observation window for the interior of said tube.

10. A disc assembly as set forth in claim 9, wherein each of said grooves is substantially U-shaped but square-cornered, wherein said composite channel and said tube are both of square cross-section, wherein one of said disc sections has therein a central aperture, and wherein one wall of said tube has therein an aperture aligned with said first-mentioned aperture, thereby to provide an observation window for the interior of said tube.

No references cited.

MORRIS O. WOLK, *Primary Examiner.*

J. H. TAYMAN, JR., *Assistant Examiner.*